(12) United States Patent
Van Den Bergen

(10) Patent No.: US 8,779,038 B2
(45) Date of Patent: Jul. 15, 2014

(54) FLAME RETARDANT RADIATION CURABLE COMPOSITIONS

(75) Inventor: Hugues Van Den Bergen, Drogenbos (BE)

(73) Assignee: Allnex Belgium S.A., Brussels (BE)

( * ) Notice: Subject to any disclaimer, the term of this patent is extended or adjusted under 35 U.S.C. 154(b) by 583 days.

(21) Appl. No.: 13/054,197

(22) PCT Filed: Aug. 3, 2009

(86) PCT No.: PCT/EP2009/060040
§ 371 (c)(1),
(2), (4) Date: Jan. 14, 2011

(87) PCT Pub. No.: WO2010/015603
PCT Pub. Date: Feb. 11, 2010

(65) Prior Publication Data
US 2011/0129680 A1    Jun. 2, 2011

(30) Foreign Application Priority Data
Aug. 8, 2008    (EP) ..................... 08105003

(51) Int. Cl.
*C08K 5/5357*    (2006.01)
(52) U.S. Cl.
USPC ....................................... 524/123
(58) Field of Classification Search
USPC ....................................... 524/123
See application file for complete search history.

(56) References Cited

U.S. PATENT DOCUMENTS

| | | | |
|---|---|---|---|
| 4,273,881 A | 6/1981 | Otten | |
| 7,723,429 B2 * | 5/2010 | Ku et al. | 524/710 |
| 7,781,515 B2 * | 8/2010 | Ryu et al. | 524/710 |
| 2003/0133679 A1 | 7/2003 | Murphy et al. | |
| 2005/0282018 A1 | 12/2005 | Van Den Bergen et al. | |

FOREIGN PATENT DOCUMENTS

| | | |
|---|---|---|
| EP | 0075863 | 5/1983 |
| GB | 2 264 262 | 8/1993 |
| JP | S58-83052 | 5/1983 |
| WO | 01/59002 | 8/2001 |
| WO | 2004035308 | 4/2004 |
| WO | 2005017021 | 2/2005 |

OTHER PUBLICATIONS

E. Weil, "Flame Retardants, Phosphorus", Kirk-Othmer Encyclopedia of Chemical Technology, 2001, vol. 11, pp. 484-510.
International Search Report issued Oct. 9, 2009 in International (PCT) Application No. PCT/EP2009/060040.

* cited by examiner

*Primary Examiner* — Peter Szekely
(74) *Attorney, Agent, or Firm* — Wenderoth, Lind & Ponack, L.L.P.

(57) ABSTRACT

The invention relates to a flame retardant composition comprising at least one polymer precursor, at least one flame retardant (A) selected from cyclic phosphonate esters responding to formula (I) and at least one flame retardant (B) selected from phosphorus derivatives different from the cyclic phosphonates of formula (I) and their use to make fire resistant glass laminates.

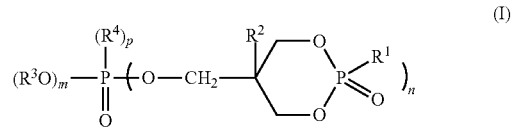

15 Claims, No Drawings

FLAME RETARDANT RADIATION CURABLE COMPOSITIONS

The present invention relates to flame retardant compositions as well as their use for making fire resistant glass laminates and the glass laminates thereby obtained.

The technique of laminating glass panes, i.e. bind two or more glass panes together in a permanent way by an interlayer, is well known and generally applied. Such glass laminates are for example used for automotive and building applications. Laminating protects people for splinters in case of glass breaking and it also allows to improve the impact resistance or sound insulation properties of the glazing. Laminated glass can be produced by liquid cast-in-place resin polymerised in situ. In this technique, two glass panes are bond together by a double-sided adhesive tape that also functions as a distance holder. The thus created cavity between the two sheets is then filled up with a liquid resin. The liquid resin is then polymerised, the so-called "curing", by radiation or chemically by appropriate catalysts and accelerators. After completion of the polymerisation a solid interlayer is formed. The chemical nature of the liquid resins used for glass lamination can be of different kinds, either polyester, polyurethane, silicone or acrylic. Nowadays mostly applied are UV resins, initiated by the action of UV light of low intensity. The UV radiation activates the reactive monomers of the system and starts the polymerization. UV curable liquid resin systems are described in i.e. EP0108631.

Flame retardant glass laminates have for example been described in WO 2004/035308.

Flame retardant compositions having good flame retardant properties, i.e. said to meet the stringent flammability rating of UL94 V0 have also been described in WO 2005/054330. WO 2005/054330 relates to flame retardant curable compositions comprising at least two flame retardants belonging to different classes of compounds, especially the combination of brominated flame retardants with aluminum hydroxide and phosphorous containing compounds. The use of halogenated flame retardant compositions is less desired. In fire, halogen groups can generate toxic and corrosive combustion products. Corrosive gases have a toxic impact on living bodies. Moreover, these corrosive combustion products can cause significant damage for example to electronic components.

Therefore there is still a need to find fire resistant glass which combine high impact resistance properties and high fire resistance. Moreover these glasses should be easy to prepare and to handle and should be transparent.

Applicant has now found that compositions comprising a specific combination of selected cyclic phoshonate esters and other phosphorous containing compounds permit to overcome these problems, have excellent fire resistance under the UL94 test and permit to manufacture fire resistant glass laminates which are transparent and have high impact resistance.

The present invention therefore relates to a radiation curable flame retardant composition comprising at least one polymer precursor, at least one flame retardant (A) selected from cyclic phosphonate esters responding to formula (I)

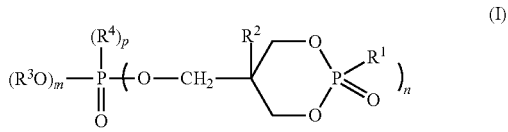

(I)

wherein n is 1, 2 or 3, m is 0, 1 or 2 and p is 0 or 1 with the proviso that n+m+p=3, $R^1$ represents an alkyl comprising from 1 to 4 carbon atoms, optionally substituted by a hydroxyl group, $R^2$ represents an alkyl comprising from 1 to 4 carbon atoms, $R^3$ and $R^4$, each independently, represents an alkyl comprising from 1 to 8 carbon atoms, phenyl, optionally substituted by one or more halogen or hydroxyl, tolyl, xylyl, benzyl, phenethyl, hydroxyethyl, phenoxyethyl or dibromophenoxyethyl;

and at least one flame retardant (B) selected from phosphorus derivatives different from the cyclic phosphonates of formula (I).

The flame retardant composition comprises at least one polymer precursor. The term polymer precursor is used to designate a monomer or oligomer or mixtures thereof which have suitable polymerisable functionality, preferably comprising at the chains ends or laterally along the chain, one or more acrylic, methacrylic or vinyl groups.

The term "(meth)acrylate" used in the present invention is meant to encompass both acrylate and methacrylate compounds, as well as mixtures thereof.

The composition according to the invention generally contains from 25 to 94% by weight of one or more polymer precursor, preferably from 45 to 90%, and most preferably from 50 to 80% by weight.

The radiation curable polymer precursor is generally selected from monomers and oligomers comprising one or more (meth)acryl group.

The monomers are generally mono-, di-, tri- and/or tetra-(meth)acrylates. Suitable monomers include (meth)acrylic acid, beta-carboxyethyl acrylate, butyl(meth)acrylate, methyl(meth)acrylate, isobutyl (meth)acrylate, 2-ethylhexyl (meth)acrylate, cyclohexyl (meth)acrylate, n-hexyl (meth)acrylate, isobornyl (meth)acrylate, isooctyl (meth)acrylate, n-lauryl (meth)acrylate, octyl/decyl (meth)acrylate, 2-hydroxyethyl(meth)acrylate, phenoxyethyl(meth)acrylate, nonylphenolethoxylate mono(meth)acrylate, 2-(-2-ethoxyethoxy)ethyl(meth)acrylate, 2-butoxyethyl (meth)acrylate, cardura (meth)acrylate, N-vinyl pyrrolidone, 1,6-hexanediol di(meth)acrylate, pentaerythritoltri(meth)acrylate, trimethylolpropanetri(meth)acrylate, phenylglycidylether(meth)acrylate, and the oxyethylated or/and oxypropylated derivatives thereof. Preferred are mono(meth)acrylates, especially acrylic acid, butylacrylate, methylmethacrylate, 2-ethylhexylacrylate and isobornylacrylate. More preferred are n-butylacrylate, acrylic acid and 2-ethylhexylacrylate.

The total quantity of monomer(s) used as polymer precursor is generally from 0 to 100% by weight relative to the total amount of polymer precursors used in the composition. The quantity of monomer(s) is preferably at least 20% by weight, more preferably at least 30% and most preferably at least 45%, by weight of polymer precursors. The total quantity of monomer(s) does usually not exceed 95% by weight, preferably it does not exceed 90% by weight of the total weight of polymer precursors.

Preferred oligomers used in the composition according to the invention are those having a molecular weight MW of from 1000 to 10000. Preferred are those having a MW of at least 2000, especially those having a MW of at least 4000. Preferred oligomers have a MW of at most 7000, more preferably of at most 6000 as determined by gel permeation chromatography (GPC).

The number average molecular weight (Mn) given above is measured by GPC (in THF on a 3×PLgel 5 µm Mixed-D LS 300×7.5 mm column MW range 162 to 377400 g/mol calibrated with polystyrenes standards, at 40° C., using a Merck-Hitachi apparatus).

Preferred oligomers are selected from urethane (meth) acrylates, polyester (meth)acrylates and epoxy (meth)acrylates, more particularly flexible urethane and epoxy (meth) acrylates having an elongation at break of 10 to 500%, more preferably 50 to 300%. The elongation at break is measured by tensile testing of a radiation-cured thin free-film of the oligomer according to ASTM D 638.

Urethane(meth)acrylates are well known in the art and commercially available products. Suitable urethane (meth) acrylates have for example been described in WO 2004/037599. Examples of a suitable urethane(meth)acrylates are urethane acrylates EBECRYL®230 and EBECRYL®270 commercially available from Cytec Surface Specialties.

Epoxy(meth)acrylates, i.e. (meth)acrylate esters of epoxy resins, are also well known in the art. Suitable epoxy (meth) acrylates have for example been described in Technical Conference Proceedings—RadTech 2002: The Premier UV/EB, Conference & Exhibition, Indianapolis, Ind., United States, Apr. 28-May 1, 2002 (2002), 171-181 Publisher: RadTech International North America, Chevy Chase, Md. Examples of a suitable epoxy(meth)acrylate are those commercialized under the names of EBECRYL®3708 and EBECRYL®3302.

Urethane (meth)acrylates, especially aliphatic urethane acrylates are particularly preferred.

The total quantity of oligomer(s) used as polymer precursor in the composition is generally from 0 to 100% by weight relative to the total amount of polymer precursors used in the composition. The total quantity of oligomer(s) is preferably at least 5% by weight, more preferably at least 10 by weight relative to the total amount of polymer precursors used in the composition. The quantity of oligomer(s) preferably does not exceed 80% by weight, more preferably it does not exceed 70% by weight and most preferably it does not exceed 55% by weight, relative to the total amount of polymer precursors used in the composition.

The compositions used in the present invention preferably comprise at least one oligomer and at least one monomer such as described here above as polymer precursor.

The flame retardant (A) used in the composition according to the invention is preferably selected from the compounds of formula (I) wherein n is 1 or 2, m is 0 or 1 and p is 1. Preferred are compounds wherein $R^1$, $R^2$, $R^3$ and $R^4$, each independently, are selected from alkyl groups comprising 1 to 4 carbon atoms. Particularly preferred are those wherein $R^2$ is ethyl and $R^1$, $R^3$ and $R^4$ are methyl.

Especially preferred are compounds responding to formula (II) and (III) as well as mixtures thereof

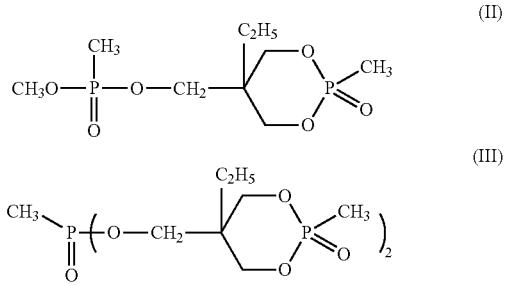

These flame retardants have been described in U.S. Pat. No. 3,789,091 and U.S. Pat. No. 3,849,368 the content of which is incorporated herein.

The flame retardant radiation curable composition generally contain from 3 to 40% by weight of frame retardant (A).

The composition preferably comprises at least 5% by weight and more preferably at least 10% by weight of flame retardant (A). The total quantity of flame retardant (A) does usually not exceed 35% by weight.

The flame retardant (B) is generally selected from phosphates, phosphonates, phosphinates, phosphites and phosphine oxides, preferably from organic phosphates and phosphonates. Illustrative phosphates that can be used as flame retardants (B) include polyarylphoshate esters, such as triphenylphosphate, tricresylphosphate, trixylylphosphate, cresyl diphenylphosphate, diphenyl xylylphosphate, 2-biphenylyl-diphenylphosphate, alkylated polyaryl phosphate esters such as butylated triphenylphosphate, t-butylphenyl diphenylphosphate, bis(t-butyl)phenylphosphate, tris(t-butylphenyl)phosphate, tris(2,4-di-t-butylphenyl)phosphate, isopropylated triphenylphosphates, isopropylated t-butylated triphenylphosphates, t-butylated triphenylphosphates, isopropylphenyl diphenyl phosphate, bis(isopropylphenyl)phenyl phosphate, 3,4-diisopropylphenyl) diphenylphosphate, tris(isopropylphenyl)phosphate, (1-methyl-1-phenylethyl) phenyl diphenyl phosphate, nonylphenyl diphenyl phosphate, 4-[4-hydroxyphenyl(propane-2,2-diyl)]phenyl diphenyl phosphate, 4-hydroxyphenyl diphenyl phosphate, resorcinol bis(diphenyl phosphate), bisphenol A bis(diphenyl phosphate), bis(ditolyl)isopropylidenedi-p-phenylene bis (phosphate), O,O,O',O'-tetrakis(2,6-dimethylphenyl)-O,O'-m-phenylene bisphosphate, alkylarylphosphate esters such as 2-ethylhexyl diphenylphosphate, isodecyl diphenylphosphate, diethylphenethylamidophosphate diisodecyl phenyl phosphate, dibutyl phenyl phosphate, methyl diphenyl phosphate, butyl diphenylphosphate, diphenyl octyl phosphate, isooctyl diphenyl phosphate, isopropyl diphenyl phosphate, diphenyl lauryl phosphate, tetradecyl diphenylphosphate, cetyl diphenyl phosphate, tar acids cresylic diphenyl phosphates, trialkyl phosphate esters, such as triethylphosphate, tributylphosphate, tri(butoxyethyl)phosphate,3-(dimethylphosphono)propionic acid methyloamide and pentaerythritol cyclic phosphate.

Illustrative phosphonates that can be used as flame retardants (B) are dimethyl methylphosphonates, diethyl ethyl phosphonate, diethyl bis(hydroxyethyl)aminomethylphosphonate, diethyl (2-oxopropyl)phosphonate, dimethyl-propylphosphonate.

Illustrative phosphites are alkylphosphites and arylphosphites such as triphenylphosphite.

The flame retardant (B) is preferably selected from organic phosphates and phosphonates, especially from alkylphosphate esters, aryl phosphate esters, alkylarylphosphate esters, alkylphosphonate esters, aryl phosphonate esters, alkylarylphosphonate esters.

Particularly preferred are polyarylphosphate esters, more preferably phosphate esters derived from bisphenol A such as bisphenol A bis(diphenyl phosphate).

The flame retardant radiation curable composition generally contains from 3 to 35% by weight of flame retardant (B). The flame retardant radiation curable composition generally preferably contains at least 5% by weight and more preferably at least 10% by weight of flame retardant (B). The total quantity of flame retardant (B) does usually not exceed 30% by weight.

The respective weight ratio of flame retardant (A) to flame retardant (B) in the radiation curable composition is usually from 0.1 to 10, preferably 0.2 to 2, more preferably from 0.5 to 1.

The flame retardant radiation curable composition according to the present invention is preferably free of halogen containing radiation curable precursors and free of halogen containing flame retardants.

The compositions according to the present invention generally comprise a photochemical initiator and/or a chemical initiator. Photochemical initiators (also called photoinitiators) are compounds that can generate radicals by absorption of light, typically UV light. Typical photochemical initiators are described in "The chemistry of free radical polymerization", edited by Graeme Moad and David H. Solomon; Pergamon (1995), pages 84 to 89. Alternatively, the same composition without photoinitiator can be cured by electron beam.

Chemical initiators are typically azo-compounds or peroxides that are decomposed to radicals through the application of heat, light or a redox process. The mechanisms are described in "The chemistry of free radical polymerization", edited by Graeme Moad and David H. Solomon; Pergamon (1995), pages 53-95.

The composition according to the invention typically contains from 0 to 5% by weight of at least one photoinitiator. Preferably, the amount of photoinitiator in the composition is comprised between 0.01 and 3% by weight.

The radiation curable composition according to the present invention can also contain other compounds, such as adhesion promoters, stabilizers, antioxidants and UV-absorbers. The amount of other compounds usually does not exceed 10% by weight. Preferably, the composition comprises from 0.01 to 3% by weight of adhesion promotor, especially those selected from silanes.

The radiation curable composition according to the invention is generally prepared by adding the flame retardant(s) to one or more of the polymer precursor(s), especially to one or more of the monomer(s) or to a mixture of polymer precursors until a single phase solution is obtained. The mixing is generally done at a temperature from 5 to 100° C. Alternatively the flame retardant(s) may be dissolved in part of the polymer precursor(s) and then the rest of the polymer precursor(s) are added to the mixture. Alternatively, the polymer precursor(s) can be added to the flame retardant(s).

The radiation curable flame retardant composition generally have a viscosity at 25° C. of from 1 to 10000 mPa·s, preferably of from 10 to 1000 mPa·s, more preferably from 10 to 250 mPa·s as measured using a cone and plate viscosimeter.

The radiation curable flame retardant compositions according to the present invention permit to meet the V2 and higher classification (V1 and even V0) of the UL-94 test at 1 mm film thickness. The compositions permit to produce transparent layers. The composition according to the invention shows improved flame retardant properties, high impact resistance, acoustic insulation, aging resistance and adhesion on laminates.

The radiation curable compositions according to the invention are therefore suitable for a large number of applications, such as casting resin for glass laminates and more specifically for fire resistant glass laminates, polycarbonate laminates, UV curable adhesives and flame retardant coatings.

The radiation curable compositions according to the invention are particular useful for making laminates, especially glass laminates.

By glass laminates is understood laminates comprising at least one glass pane.

In the present description, the term "glass" is used to designate objects made of glass or of glass appearance. Glass appearance objects such as polycarbonate panels can be used but are less preferred because of their poor behavior in case of fire. The glass objects can be made of ordinary soda lime glass (float glass), whether tempered or not, or of special glass such as borosilicate glass (whether tempered or not) or ceramic glasses, and wired glass. It can also be used for the lamination of fire resistant glazing comprising inorganic and organic intumescent interlayers.

The laminates also include stone/glass laminates.

The present invention also provides a method of producing a laminate according to the invention comprising the steps of (i) providing a flame retardant composition as described here above; (ii) place the flame retardant composition between two panes, at least one of which is glass, and (iii) let the composition cure to form the polymer which forms the interlayer between the panes.

The steps (i), (ii) and (iii) involved into the claimed method are not necessarily distinct, successive, separated steps. In a preferred embodiment, the curable composition can be placed between the panes, allowed to cure by irradiation under UV-light, so as to form a laminate comprising a cured composition layer ("interlayer") bonding the panes together.

The flame retardant composition is more preferably "cast" in a casting cell comprising two opposed outer plies, spaced apart and separated from one another by a peripheral spacer between them, and cured in the cell. Such techniques are well known and are described in, for example, GB-A-2015417 and GB-A-2032844, and in EP-A-0200394. Curing is preferably done by irradiation, more preferably by UV light, especially by the action of UV light of low intensity. Typically an intensity of 1 to 10, preferably of 1.5 to 2.5, mW/cm$^2$ is used.

Typically, the residence time in the UV oven is from 5 to 60, preferably from 15 to 30 minutes. According to a variant of the invention, multi-sheet laminates, i.e. laminates comprising more than one glass pane and/or more than one other pane may be used. The glass panes used in the present invention may be of the same nature or different. For example float glass/ceramic glass or borosilicate glass. In these multi-sheets laminates, comprising several laminates bound to each other with an interlayer, each interlayer may be of the same or different composition, flame retardant or not.

The glass used in the present invention can be tempered or not.

It has been observed that a radiation curable composition comprising a flame-retardant component permits to bond the two glass sheets together and to form a glass laminate presenting an advantageous combination of properties desired for flame retardant laminates.

The present invention also relates to glass laminates comprising at least one interlayer obtained from the flame retardant composition according to the invention. The laminates according to the invention present good fire resistance. They also have a significant improved impact resistance and safety impact performance. They are halogen-free.

The laminates according to the invention are easy to handle and can be cut on size when the glass is not tempered.

The flame retardant radiation curable composition should be transparent when a transparent product is required i.e. as the interlayer of a fire-resistant laminate to be used as a window. The term "transparent" is used herein to describe products and materials which transmit light so that they are suitable for glazing applications providing clear through vision being transparent, colorless or not.

A strong technical advantage of the liquid resin system is that the cavity between the two glasses is completely filled up with the liquid resin, the shape or roughness of the glass surfaces is of no importance on the bonding with the resin interlayer. The incorporation of adhesion promoters(s), most often appropriate silanes, allows for a chemical bond to be created between the silanol (—Si—OH) functions on the glass surface, and the interlayer.

The present invention is illustrated by the following, non-limiting examples.

Compositions of Example 1 to 7 and comparative examples 8 R to 12 R have been prepared by mixing the different compounds as described in Table 1 here below. Unless otherwise specified the amounts of the different compounds is given in g.

TABLE 1

|  | 1 | 2 | 3 | 4 | 5 | 6 | 7 | 8R | 9R | 10R | 11R | 12R |
|---|---|---|---|---|---|---|---|---|---|---|---|---|
| n-butylacrylate |  | 40 | 33 | 0 | 40 | 40 | 40 |  | 40 | 40 | 48.5 | 15 |
| ethylhexylacrylate | 40 |  |  | 35 |  |  |  | 59 |  |  |  |  |
| acrylic acid | 15 | 15 | 17 | 15 | 15 | 15 | 15 | 12 | 15 | 15 | 15 | 15 |
| EBECRYL ® 230 | 10 | 10 | 11 | 10 | 10 | 10 | 10 | 7.6 | 10 | 10 | 10 | 10 |
| AMGARD ® CU | 20 | 20 | 17 | 25 | 20 | 20 | 20 | 20 | 35 |  | 26.5 |  |
| NCENDX ® P-30 | 15 | 15 | 22 | 15 |  |  |  |  |  | 35 |  | 60 |
| triphenylphosphate |  |  |  |  | 15 |  |  |  |  |  |  |  |
| triphenylphosphite |  |  |  |  |  | 15 |  |  |  |  |  |  |
| CYAGARD ® RF1243 |  |  |  |  |  |  | 15 |  |  |  |  |  |
| Silane |  | 2 |  |  | 2 | 2 | 2 |  | 2 | 2 | 2 | 2 |
| PI | 0.3 | 0.3 | 0.3 | 0.3 | 0.3 | 0.3 | 0.3 | 0.3 | 0.3 | 0.3 | 0.3 | 0.3 |
| % P | 5.3 | 5.3 | 5.4 | 6.3 | 5.4 | 5.5 | 6.2 | 4.0 | 6.4 | 3.1 | 5.3 | 5.3 |

EBECRYL ® 230 is an aliphatic difunctionnal urethane acrylate with improved flexibility.

NcendeX ® P-30 is a proprietory flame retardant phosphate ester from Albermarle containing 8.9 wt % P;

AMGARD ® CU is a mixture of cyclic phosphonate esters from Rhodia containing 20 wt % P, CYAGARD ® RF1243 is a phosphine oxide commercialized by CYTEC, IP is a photo initiator commercialized under the name of ADDITOL ® CPK.

% P represents the % in weight of P presented in the composition.

The properties of these compositions were measured and are reported in the Table 2. Viscosities were measured using a cone and plate viscosimeter (Modular Compact Rheometer MCR-100; used cone:cone CP50-1; shear rate 20 s$^{-1}$).

The so-called UL-94 test is a standard test for measuring flammability and has been described in Underwriters Laboratories UL94, Test for flammability of Plastic Materials—UL94, Jul. 29, 1997, the disclosure of which is hereby incorporated herein by reference. In this test, the materials are classified as V0, V1 or V2 depending on the flame retardant performance.

duced in the interspace using a funnel. Curing was done in a conventional UV oven, intensity measured on the interlayer was 1.5-2.5 mW/cm$^2$. Curing time was 20-25 minutes.

The aspect of the glass laminates is reported in Table 2: trans means that transparent laminates were obtained; haze means hazy laminates were obtained; opaq means that the laminates obtained were nearly opaque.

Safety performance of the glass laminates was assessed by an impact test similar to NBN S23-002(=STS38), dropping a steel ball of 2.2 kg from a height of 1.5 m onto the 30 cm×30 cm soda lime glass laminates as described above. The test was repeated until the steel ball passed through the laminate. The impact number is defined as the maximal number of impacts the laminate was able to resist before the steel ball passed through it.

TABLE 2

| | Example | | | | | | | | | | | |
|---|---|---|---|---|---|---|---|---|---|---|---|---|
| | 1 | 2 | 3 | 4 | 5 | 6 | 7 | 8R | 9R | 10R | 11R | 12R |
| Viscosity @25° C. | 36 | 18 | 27 | 51 | 7 | 7 |  |  | 19 | 10 | 9 | 114 |
| Impact resistance | 3 |  | 5 | 2 |  |  |  | 1 |  |  |  |  |
| Aspect of the laminate | trans | trans | trans | trans | trans | trans | trans | trans | haze | trans | haze | opaq |
| UL 94 vertical | V1 | V0 | V0 | V1 | V0 | V0 |  | NC | V1 | NC | V1 | NC |

UL94 specimens for 127 mm×12.7 mm Vertical Burning Test were prepared with a film thickness of 1 mm. Free films were prepared by pouring the composition onto a silicone release paper using a 1 mm thickness tape to hold the liquid. The liquid was covered by a polyester film and cured under UV light in a conventional UV oven, intensity was 1.5-2.5 mW/cm$^2$ during 20-25 minutes. After curing, the specimens were cut on size, the silicon release paper and the polyester films were removed. NC means non classified, meaning that they were neither V0, V1 or V2.

Glass laminates were made by bounding two soda lime (float) glass panes of 30×30 cm, 4 mm nominal thickness together with double-sided tape of 1 mm thickness. The composition as described in the aforementioned table was intro- The results presented in table 2 show that the compositions comprising at least 2 flame retardants according to the invention permit to obtain transparent laminates which have very good flame resistance with a film achieving a UL 94 classification of V1 or better (V0) and having at the same time good impact resistance.

The invention claimed is:

1. A radiation curable flame retardant composition comprising at least one polymer precursor selected from the group consisting of monomers and oligomers comprising one or more (meth)acryl groups, at least one flame retardant (A) selected from cyclic phosphonate esters responding to formula (I)

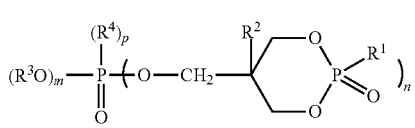

wherein n is 1, 2 or 3, m is 0, 1 or 2 and p is 0 or 1 with the proviso that n+m+p=3,
$R^1$ represents an alkyl comprising from 1 to 4 carbon atoms, optionally substituted by a hydroxyl group,
$R^2$ represents an alkyl comprising from 1 to 4 carbon atoms,
$R^3$ and $R^4$, each independently, represents an alkyl comprising from 1 to 8 carbon atoms, phenyl, optionally substituted by one or more halogen or hydroxyl, tolyl, xylyl, benzyl, phenethyl, hydroxyethyl, phenoxyethyl or dibromophenoxyethyl;
and
at least one flame retardant (B) selected from organic phosphorus compounds different from the cyclic phosphonates of formula (I)
wherein the polymer precursor comprises at least 5% by weight of one or more oligomers that are selected from the group consisting of urethane (meth)acrylates, polyester (meth)acrylates and epoxy (meth)acrylates.

2. The radiation curable composition according to claim 1 wherein flame retardant (A) is selected from the compounds of formula (I) wherein n is 1 or 2, m is 0 or 1 and p is 1.

3. The radiation curable composition according to claim 2 wherein flame retardant (A) is selected from the group consisting of the compounds of formula (II) and (III) as well as mixtures thereof

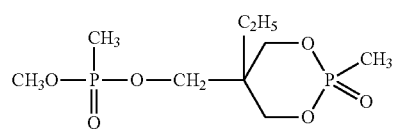

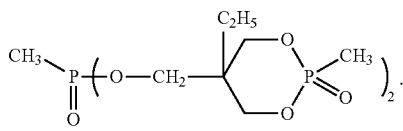

4. The radiation curable composition according to claim 1 wherein flame retardant (B) is selected from the group consisting of phosphates, phosphonates, phosphinates, phosphites and phosphine oxides.

5. The radiation curable composition according to claim 4 wherein flame retardant (B) is selected from the group consisting of alkylphosphate esters, aryl phosphate esters, alkylarylphosphate esters, alkylphosphonate esters, aryl phosphonate esters, and alkylarylphosphonate esters.

6. The radiation curable composition according to claim 5 wherein flame retardant (B) is selected from polyarylphosphate esters derived from bisphenol A.

7. The radiation curable composition according to claim 1 comprising from 25 to 94% by weight of one or more polymer precursor, from 3 to 40% by weight of flame retardant (A) and from 3 to 35% by weight of flame retardant (B).

8. The radiation curable composition according to claim 7 wherein the polymer precursor comprises at least 20% by weight of one or more monomers selected from the group consisting of mono-, di-, tri-, tetra-(meth)acrylates, and mixtures thereof.

9. The radiation curable composition according to claim 7 wherein the monomers are selected from mono(meth)acrylates.

10. The radiation curable composition according to claim 1 wherein the polymer precursor comprises at least one oligomer and at least one monomer.

11. A method of producing a laminate comprising the steps of (i) providing a flame retardant composition according to claim 1; (ii) placing the flame retardant composition between two panes, at least one of which is glass, and (iii) letting the composition cure to form the polymer which forms the interlayer between the panes.

12. A glass laminate comprising at least one interlayer comprising the flame retardant composition according to claim 1.

13. The radiation curable composition according to claim 7 wherein the polymer precursor comprises at least 5% by weight of one or more oligomers with a number average molecular weight from 1000 to 10000.

14. The radiation curable composition according to claim 13 wherein the oligomers are selected from the group consisting of urethane (meth)acrylates, polyester (meth)acrylates and epoxy (meth)acrylates.

15. The radiation curable composition according to claim 1, wherein the polymer precursor comprises at least one oligomer selected from urethane (meth)acrylates.

* * * * *